(12) United States Patent
Lansu

(10) Patent No.: US 8,448,378 B2
(45) Date of Patent: May 28, 2013

(54) GREENHOUSE WITH CULTIVATION GUTTER

(75) Inventor: Peter Eduard Maria Lansu, Naaldwijk (NL)

(73) Assignee: Delftzicht Beheer B.V., Den Hoorn (NL)

( * ) Notice: Subject to any disclaimer, the term of this patent is extended or adjusted under 35 U.S.C. 154(b) by 125 days.

(21) Appl. No.: 12/740,132

(22) PCT Filed: Oct. 23, 2008

(86) PCT No.: PCT/NL2008/050665
§ 371 (c)(1),
(2), (4) Date: Jul. 9, 2010

(87) PCT Pub. No.: WO2009/061180
PCT Pub. Date: May 14, 2009

(65) Prior Publication Data
US 2012/0023816 A1    Feb. 2, 2012

(30) Foreign Application Priority Data

Nov. 5, 2007  (NL) ...................................... 1034638

(51) Int. Cl.
*A01G 9/14* (2006.01)
(52) U.S. Cl.
USPC ............................................... 47/17; 47/66.6

(58) Field of Classification Search
USPC . 47/17, 18, 65.5, 66.6, 60, 62 C, 66.7; 52/11, 52/12, 13, 14, 63, 18
See application file for complete search history.

(56) References Cited

U.S. PATENT DOCUMENTS

| | | | | |
|---|---|---|---|---|
| 1,696,159 A | * | 12/1928 | Hart .................................. | 52/14 |
| 3,911,632 A | * | 10/1975 | Bryfogle et al. .................. | 52/13 |
| 4,117,636 A | * | 10/1978 | Smith ............................... | 52/13 |
| 4,837,990 A | * | 6/1989 | Peleg ............................... | 52/63 |
| 5,197,238 A | * | 3/1993 | Peleg ............................... | 52/13 |
| 5,513,470 A | * | 5/1996 | Vollebregt ........................ | 52/13 |
| 5,581,954 A | * | 12/1996 | Vollebregt ........................ | 52/13 |
| 5,655,335 A | * | 8/1997 | Vermeer .......................... | 52/66 |
| 6,079,152 A | * | 6/2000 | Hou .................................. | 47/17 |
| 2002/0038529 A1 | * | 4/2002 | Nelson ........................... | 52/2.22 |

FOREIGN PATENT DOCUMENTS

| | | | |
|---|---|---|---|
| EP | 1 763 989 A | 3/2007 | |
| FR | 2 431 826 A | 2/1980 | |
| NL | 1 012 713 C1 | 1/2001 | |

\* cited by examiner

*Primary Examiner* — T. Nguyen
(74) *Attorney, Agent, or Firm* — Ladas & Parry LLP

(57) ABSTRACT

Greenhouse (1) comprising a roof structure (4), at least one row of multiple supporting columns (2a-2f) supporting at least a part of the roof structure (4), and a cultivation gutter (50a-50g) extending within the greenhouse (1) in the direction of the row and supported by successive supporting columns (2a-2f) in the row, wherein the cultivation gutter (50a-50g) has a center line extending in the longitudinal direction of the cultivation gutter (50a-50g) and extending through the successive supporting columns (2a-2f).

16 Claims, 4 Drawing Sheets

GREENHOUSE WITH CULTIVATION GUTTER

BACKGROUND OF THE INVENTION

The invention relates to a greenhouse with a cultivation gutter. Such greenhouses comprise a roof structure supported by supporting columns. Within the greenhouse cultivation gutters are positioned that extend parallel to each other and between which an aisle is defined. A number of cultivation gutters is attached along the supporting columns, as a result of which at the location of said cultivation gutters a large aisle is defined on one longitudinal side, whereas on the other longitudinal side the aisle is too narrow for for instance work trolleys.

It is an object of the invention to improve on this.

It is an object of the invention to provide a greenhouse in which incident daylight is used welt.

SUMMARY OF THE INVENTION

According to one aspect the invention provides a greenhouse comprising a roof structure, at least one row of multiple supporting columns supporting at least a part of the roof structure, and a cultivation gutter extending within the greenhouse in the direction of the row and supported by successive supporting columns in the row, wherein the cultivation gutter has a centre line extending in the longitudinal direction of the cultivation gutter and extending through the successive supporting columns.

According to a further aspect, the invention provides a greenhouse, particularly as stated above, comprising a roof structure, at least one row of multiple supporting columns supporting at least a part of the roof structure, and a cultivation gutter extending within the greenhouse in the direction of the row and supported by successive supporting columns in the row, wherein the supporting columns in a direction transverse to the row have two sides, wherein at least a part of the cultivation gutter extends within the sides of the successive supporting columns.

The centre line and/or at least a part of the cultivation gutter extends through and/or within the sides of the supporting columns, as a result of which the cultivation gutter takes up no or only very little room outside of the width of the supporting columns. In this way there is sufficient room available alongside the longitudinal side of the cultivation gutter for an aisle suitable to let work trolleys pass through.

In one embodiment at least a part of the cultivation gutter extends through at least one of the successive supporting columns. During construction of the greenhouse the cultivation gutter can simply be slid through the supporting columns.

In one embodiment the supporting columns are built up with at least two substantially vertical rods or bars that are positioned spaced apart from each other with the direction transverse to the direction of the row. In relation to their own weight such supporting columns are able to offer sufficient bearing capacity for the roof structure, and allow light to pass through.

In one embodiment the supporting columns are built up with two substantially vertical rods or bars that are positioned spaced apart from each other with the direction transverse to the direction of the row and that are situated in substantially the same plane. In relation to their own weight such supporting columns are able to offer sufficient bearing capacity for the roof structure, and allow light to pass through. Due to the location of the vertical rods or bars in the same plane an optimal intermediate space between the successive supporting columns can be obtained for the cultivation gutter and the crops it carries.

For the purpose of the rigidity and strength of the greenhouse, above the cultivation gutter the rods or bars are fixedly connected to each other by means of lattice struts.

In one simple embodiment the cultivation gutter extends between the bars.

The height of the cultivation gutter with respect to the basis of the greenhouse can be adjusted when the greenhouse comprises support means for the cultivation gutter, wherein the support means engage onto the supporting columns and can be adjusted as regards height with respect to the supporting columns.

In one embodiment the cultivation gutter is continuous over a length covering multiple successive supporting columns. Alternatively or additionally the cultivation gutter is integrally formed over a length covering multiple successive supporting columns. The cultivation gutter may be produced on site for instance by continuous form rolling and be brought directly into supported position.

In one embodiment thereof the cultivation gutter is continuous or integrally formed over a length covering at least two, preferably at least three supporting columns.

In one embodiment the cultivation gutter extends over substantially the full length of the greenhouse.

In one embodiment the cultivation gutter over the length has the same cross-section, for instance as a result of said continuous form rolling.

In one embodiment the cultivation gutter is made of metal, in one embodiment thereof substantially of steel, as a result of which it can be manufactured by continuous form rolling.

The greenhouse according to the invention preferably is of the Venlo-type.

The aspects and measures described in this description and the claims of the application and/or shown in the drawings of this application may where possible also be used individually. Said individual aspects may be the subject of divisional patent applications relating thereto. This particularly applies to the measures and aspects that are described per se in the sub claims.

SHORT DESCRIPTION OF THE DRAWINGS

The invention will be elucidated on the basis of a number of exemplary embodiments shown in the attached drawings, in which.

DETAILED DESCRIPTION OF THE DRAWINGS

Figure 1:
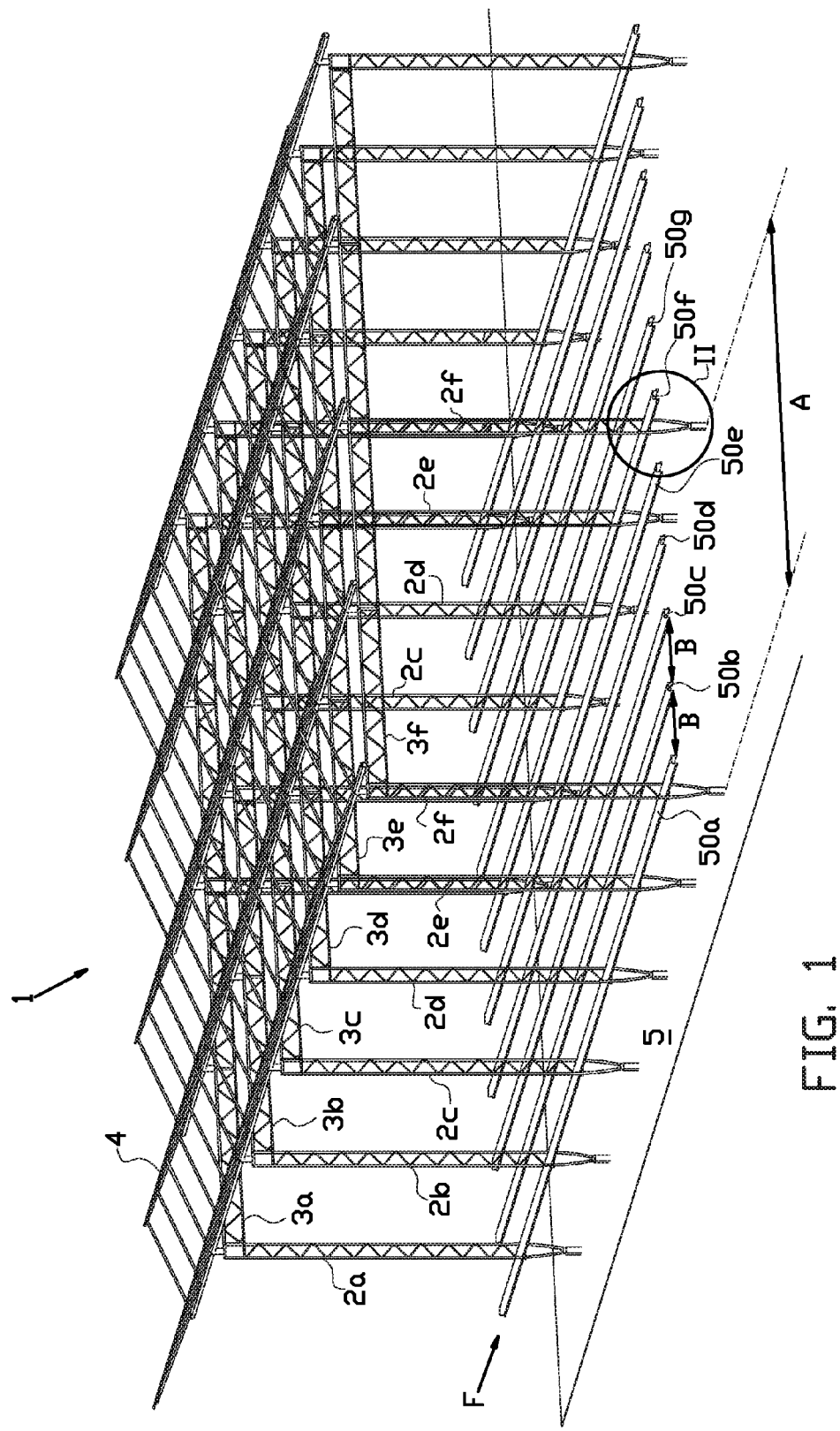
FIG. 1 shows an isometric view of a greenhouse according to the invention.

The greenhouse 1 according to the invention as shown in FIG. 1 is of the Venlo-type, and comprises a number of identical metal lattice columns 2a-2f that are positioned spaced apart and in rows oriented in the longitudinal direction L of the greenhouse 1. The lattice columns 2a-2f are connected by means of metal transverse frames 3a-3f for forming a supporting structure for the roof 4. In the greenhouse 1 in this example identical metal cultivation or horticultural gutters 50a-50g are positioned parallel to each other and extending in the longitudinal direction L of the greenhouse 1. A number of cultivation gutters 50a, 50f are connected to the lattice columns 2a-2f, the cultivation gutters 50b-50e positioned in between them are connected to supports that are not further shown.

Figure 2:
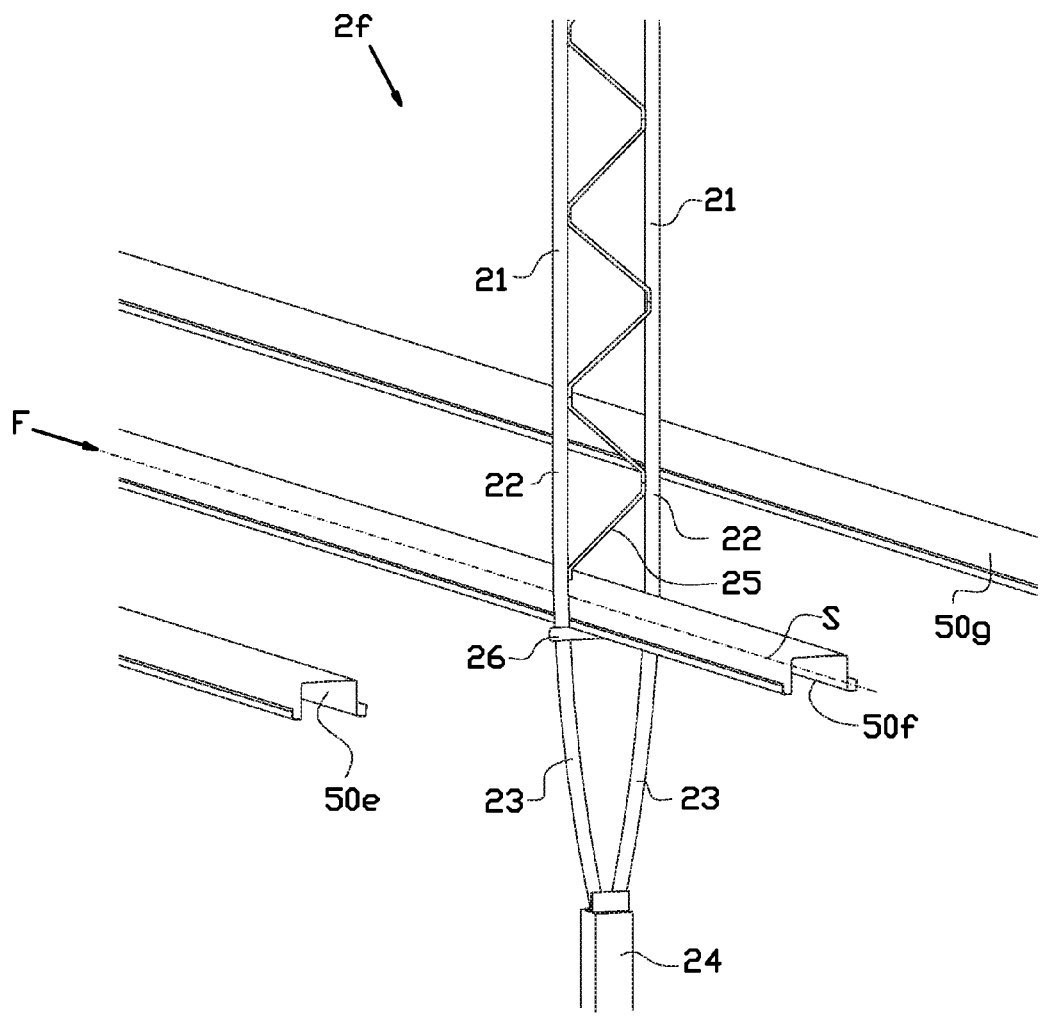
FIG. 2 shows a detail of the greenhouse according to FIG. 1, wherein a part of the lattice column and a number of cultivation gutters is shown.
Figure 3:
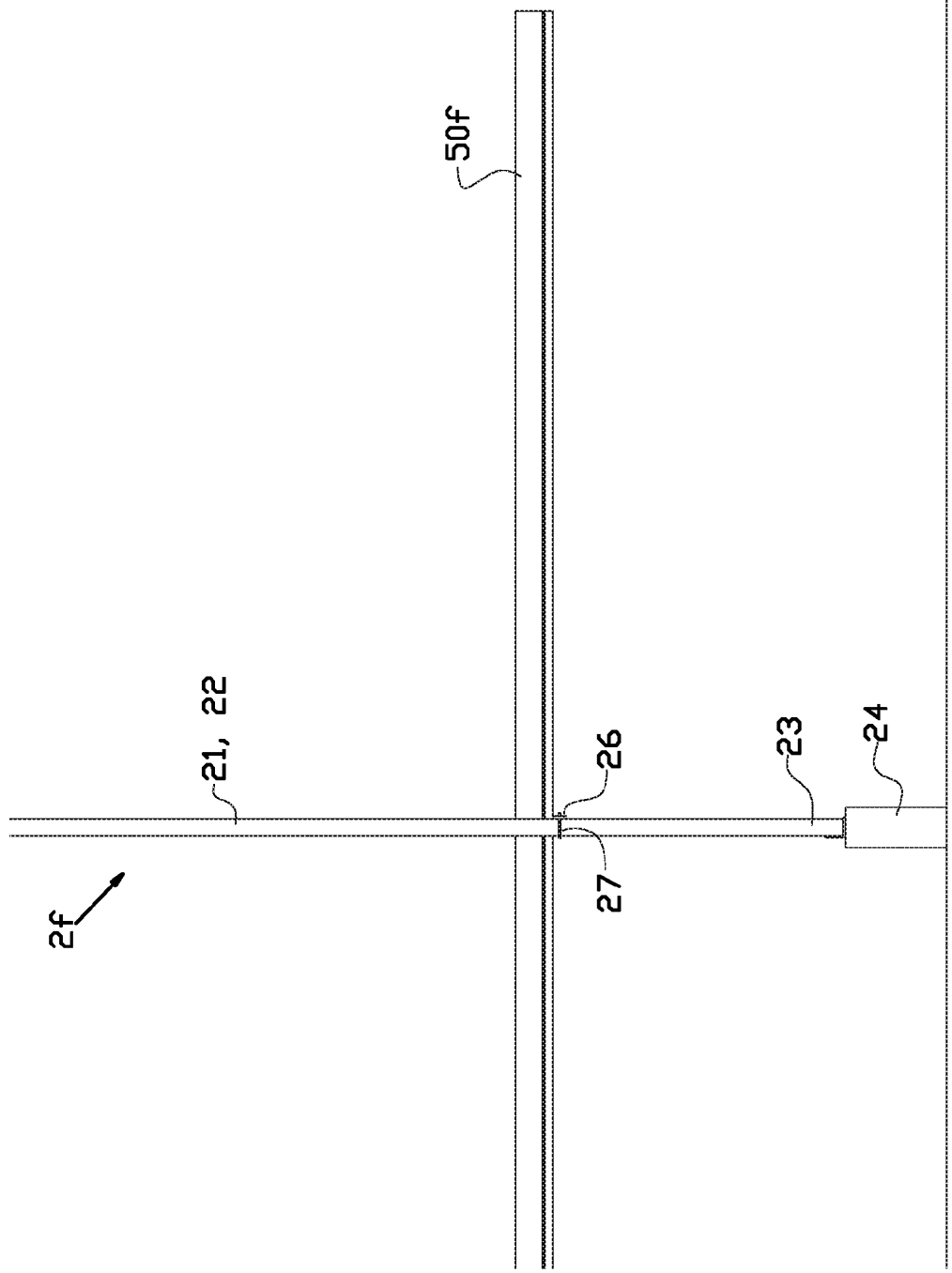
FIG. 3 shows a side view of the lattice column with the cultivation gutter according to FIG. 2.
Figure 4:
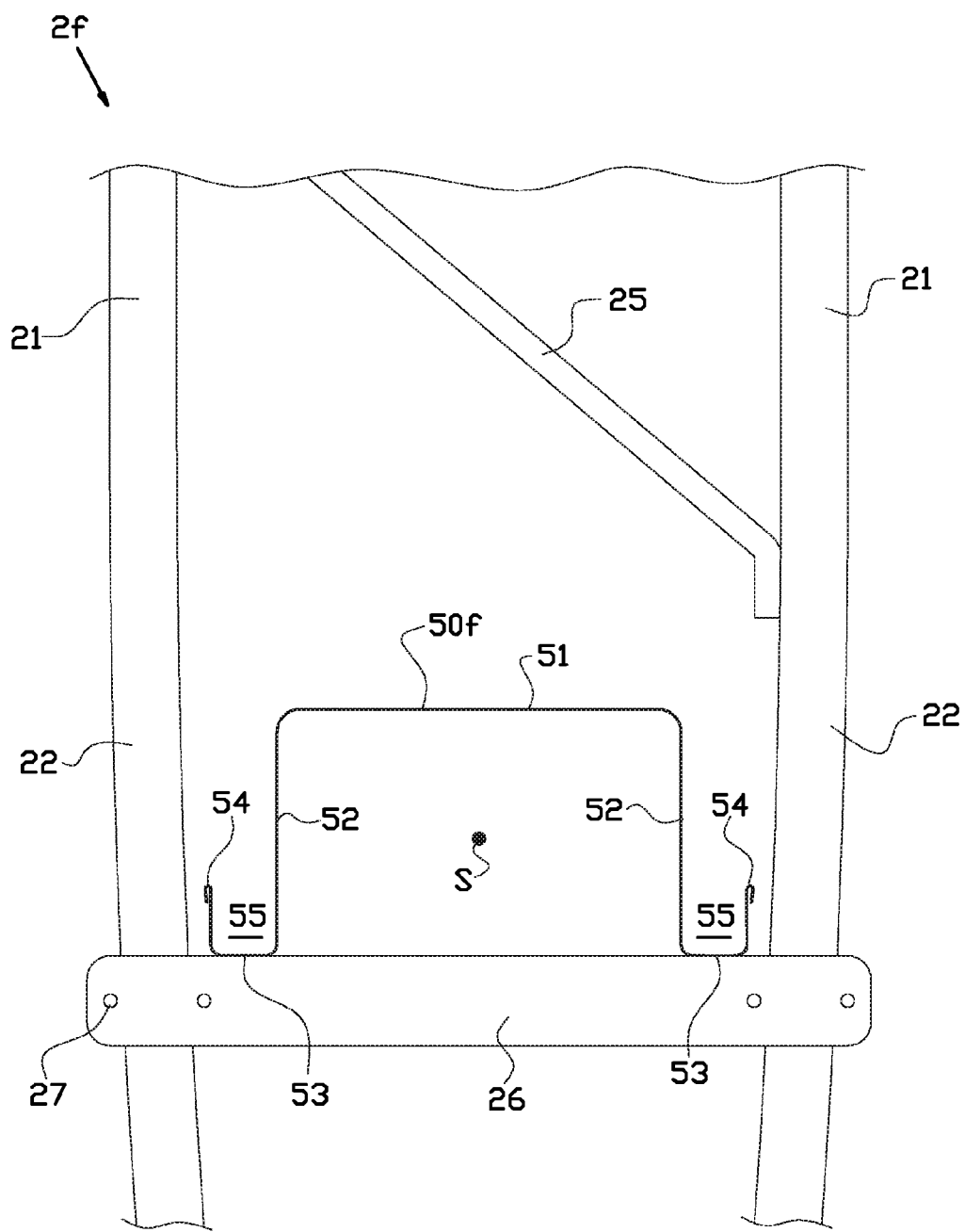
FIG. 4 shows a front view of the lattice column with the cultivation gutter according to FIG. 3.

One lattice column 2f and some cultivation gutters 50e-50g within circle II of FIG. 1 are shown in detail in FIGS. 2-4. The lattice column 2f is a so-called flat lattice column, comprising two vertical metal rods 21 extending in a same main plane, and connected one to the other by means of metal struts 25. The main plane is oriented transverse to the longitudinal direction of the cultivation gutters 50a-g. The vertical rods 21 have a straight part 22 at the location of the struts 25, and below the struts 25 a part that bends diagonally towards a foot 24. The foot 24, for instance of concrete, is partially accommodated in the floor 5, and the lattice column 2f supports thereon.

At the location of the transition from the straight part 22 to the bending part 23 a metal support profile 26 is provided. The support profile 26 extends horizontally, and is secured against the metal rods 21 by means of two nut clamps 27. A cultivation gutter 50f having centre line S supports on the support profiles 26 of the successive lattice columns 2a-2f. The height of the cultivation gutter 50f with respect to the floor is adjustable by means of the detachable nut clamps 27.

The cultivation gutter 50f is formed through continuous form rolling or profiling an elongated metal sheet or flat metal strip, for instance of steel, as a result of which the cultivation gutter 50f is continuous or integrally formed over a length covering multiple, for instance three or more successive columns 2a-f of the row in question. The cultivation gutter 50f comprises a horizontal upper plate member 51, and two side plate members 52, two horizontal foot plate members 53 and two vertically upright gutter edges 54 having a curled edge bounding a longitudinal gutter 55. The longitudinal gutters 55 provide the additional function of discharging excess water from the crop. Other additional functions can be provided for, for instance the passage of heating tubes. In this example during the construction of the greenhouse 1, the cultivation gutter 50f was slid on site directly out of the rolling device in the direction F between the vertical rods 22.

The cultivation gutters 50a, 50f, particularly their centre lines S, slid between the vertical rods 22 of the lattice columns 2a-2f, are situated within the width of said columns 2a-2f, as a result of which optimal and substantially equal centre-to-centre distances C over the width B between the rows of columns 2a-2f can be achieved. In this example the width between the rows of columns 2a-2f is approximately 8.00 meter, wherein the centre-to-centre distance C is approximately 1.60 meters everywhere.

In this example the cultivation gutters 50a, 50f have been slid in the lattice columns 2a-2f in direction F. Alternatively the cultivation gutters are built up with cultivation gutter sections that may or may not have been coupled and which have been mounted between the lattice columns 2a-2f.

The above description is included to illustrate the operation of preferred embodiments of the invention and not to limit the scope of the invention. Starting from the above explanation many variations that fall within the spirit and scope of the present invention will be evident to an expert.

The invention claimed is:

1. Greenhouse comprising a roof structure, at least one row of multiple supporting columns supporting at least a part of the roof structure, and a cultivation gutter containing growth medium extending within the greenhouse in the direction of the row and supported by successive supporting columns in the row, wherein the cultivation gutter has a centre line extending in the longitudinal direction of the cultivation gutter and extending through the successive supporting columns, wherein at its lower side the cultivation gutter has two horizontal foot plate members that are spaced apart from each other and that extend at opposite sides of the centre line and wherein the gutter is supported on the supporting columns only at the foot plate members.

2. Greenhouse, according to claim 1, wherein the supporting columns in a direction transverse to the row have two sides, wherein at least a part of the cultivation gutter extends within the sides of the successive supporting columns.

3. Greenhouse according to claim 1, wherein at least a part of the cultivation gutter extends through at least one of the successive supporting columns.

4. Greenhouse according to claim 1, wherein the supporting columns are built up with at least two vertical rods or bars that are positioned spaced apart from each other with the direction transverse to the direction of the row.

5. Greenhouse according claim 1, wherein the supporting columns are built up with two vertical rods or bars that are positioned spaced apart from each other in the direction transverse to the direction of the row and that are situated in the same plane.

6. Greenhouse according to claim 4, wherein above the cultivation gutter the rods or bars are fixedly connected to each other by means of lattice struts.

7. Greenhouse according to claim 4, wherein the cultivation gutter extends between the bars.

8. Greenhouse according to claim 1, comprising supports for the cultivation gutter, wherein the supports engage onto the supporting columns and can be adjusted as regards height with respect to the supporting columns.

9. Greenhouse according to claim 1, wherein the cultivation gutter is continuous over a length covering multiple successive supporting columns.

10. Greenhouse according to claim 1, wherein the cultivation gutter is integrally formed over a length covering multiple successive supporting columns.

11. Greenhouse according to claim 9, wherein the cultivation gutter is continuous or integrally formed over a length covering at least three supporting columns.

12. Greenhouse according to claim 1, wherein the cultivation gutter extends over the full length of the greenhouse.

13. Greenhouse according to claim 10, wherein the cultivation gutter over the length has the same cross-section.

14. Greenhouse according to claim 1, wherein the cultivation gutter is made of metal.

15. Greenhouse according to claim 14, wherein the cultivation gutter is made of steel.

16. Greenhouse according to claim 1, wherein the cultivation gutter is supported at the foot plate members by horizontally extending supports on the supporting columns.

* * * * *